(12) United States Patent
Yamada

(10) Patent No.: US 10,554,835 B2
(45) Date of Patent: Feb. 4, 2020

(54) PRINTING APPARATUS AND CONTROL METHOD

(71) Applicant: SEIKO EPSON CORPORATION, Tokyo (JP)

(72) Inventor: Yuki Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/012,153

(22) Filed: Jun. 19, 2018

(65) Prior Publication Data

US 2018/0373473 A1    Dec. 27, 2018

(30) Foreign Application Priority Data

Jun. 22, 2017 (JP) ................................. 2017-121994
Jun. 22, 2017 (JP) ................................. 2017-121995

(51) Int. Cl.
    *G06F 3/12*     (2006.01)
    *H04N 1/00*     (2006.01)

(52) U.S. Cl.
    CPC ....... *H04N 1/00623* (2013.01); *G06F 3/1204* (2013.01); *G06F 3/1208* (2013.01); *G06F 3/1219* (2013.01); *G06F 3/1252* (2013.01); *G06F 3/1258* (2013.01); *G06F 3/1259* (2013.01)

(58) Field of Classification Search
CPC combination set(s) only.
See application file for complete search history.

(56) References Cited

U.S. PATENT DOCUMENTS

| 8,836,966 | B2 | 9/2014 | Takahashi | |
|---|---|---|---|---|
| 2006/0039035 | A1 | 2/2006 | Chuang | |
| 2008/0170262 | A1 | 7/2008 | Takahashi | |
| 2012/0224204 | A1* | 9/2012 | Yamagishi | G06K 15/1882 358/1.13 |
| 2013/0088734 | A1 | 4/2013 | Kim | |
| 2015/0239695 | A1 | 8/2015 | Noda et al. | |
| 2016/0092758 | A1 | 3/2016 | Stanich | |
| 2017/0090832 | A1 | 3/2017 | Ishibashi | |
| 2017/0269545 | A1* | 9/2017 | Tanaka | G03G 15/5066 |
| 2017/0346956 | A1 | 11/2017 | Nakamura | |
| 2017/0346973 | A1 | 11/2017 | Kusakabe | |

FOREIGN PATENT DOCUMENTS

| CN | 101236374 | 8/2008 |
|---|---|---|
| JP | 2005-319638 A | 11/2005 |

OTHER PUBLICATIONS

Office Action issued in U.S. Appl. No. 16/012,631 dated May 2, 2019.

* cited by examiner

*Primary Examiner* — Helen Zong
(74) *Attorney, Agent, or Firm* — Workman Nydegger

(57) ABSTRACT

There is provided a printing apparatus including: a printing mechanism which feeds paper from a paper feeding port and performs printing on the fed paper; and a control unit which controls the printing mechanism, in which the control unit determines whether or not printing a second job is to be performed on unprinted fed paper which is fed from the paper feeding port and is not yet printed, based on paper quality of the paper used in a first job and paper quality of the paper set in the second job following the first job when a cancellation instruction is received during printing the first job and causes the printing mechanism to perform the printing of the second job on the unprinted fed paper, in a case of determining that printing is to be performed.

11 Claims, 3 Drawing Sheets

PRINTING APPARATUS AND CONTROL METHOD

The entire disclosure of Japanese Patent Application No. 2017-121994, filed Jun. 22, 2017 and Japanese Patent Application No. 2017-121995, filed Jun. 22, 2017 is expressly incorporated by reference herein. This application is also related to U.S. patent application Ser. No. 16/012,631, filed Jun. 19, 2018 and titled "PRINTING APPARATUS AND CONTROL METHOD," concurrently filed herewith.

BACKGROUND

1. Technical Field

The present invention relates to a printing apparatus and the like having a job cancellation function, and particularly relates to a printing apparatus and the like that can conveniently use unprinted fed paper at the time of job cancellation.

2. Related Art

In the related art, in a printer that performs printing at high speed, the paper is controlled so that the paper can be fed into the machine before printing so as to be able to print immediately. Therefore, some sheets of paper following the paper during printing are in a state of being already present between a paper feeding port and a printing unit.

Therefore, if a job cancellation is instructed during printing, blank sheets of paper that are not yet printed in the printer will remain, and there is a concern that these sheets of paper are wasted.

In relation to such a problem, in JP-A-2005-319638, an invention is disclosed which suppresses discharging of waste paper by performing printing of a subsequent printing job on an unprinted paper remaining in a printer casing.

In the apparatus described in JP-A-2005-319638, only in a case where the unprinted fed paper and the subsequent printing job paper are the same in the paper size and the paper discharging direction, printing is to be performed on the unprinted fed paper.

However, in such control, a technology is required which does not take into consideration the paper feeding port and the type of printed matter specified at the time of the print request, further enhances the user's convenience, and can more effectively utilize paper.

SUMMARY

An advantage of some aspects of the invention is to provide a printing apparatus that can conveniently use unprinted fed paper at the time of job cancellation in a printing apparatus having a job cancellation function.

According to an aspect of the invention, there is provided a printing apparatus including: a printing mechanism which feeds paper from a paper feeding port and performs printing on the fed paper; and a control unit which controls the printing mechanism, in which the control unit determines whether or not printing a second job is to be performed on unprinted fed paper which is fed from the paper feeding port and is not yet printed, based on paper quality of the paper used in a first job and paper quality of the paper set in the second job following the first job when a cancellation instruction is received during printing the first job and causes the printing mechanism to perform the printing of the second job on the unprinted fed paper, in a case of determining that printing is to be performed.

According to the configuration, it is possible to make effective use of the unprinted fed paper without impairing user's needs.

Further, in the printing apparatus, preferably, the control unit determines that the printing of the second job is to be performed on the unprinted fed paper in a case where paper quality of the unprinted fed paper and the paper quality set in the second job coincide with each other.

According to the configuration, it is possible to make effective use of the unprinted fed paper without impairing user's needs.

Further, in the printing apparatus, preferably, the control unit determines that the printing of the second job is to be performed on the unprinted fed paper, in a case where paper quality and a paper size of the unprinted fed paper and a paper quality and the paper size set in the second job coincide with each other.

According to the configuration, it is possible to make effective use of the unprinted fed paper without impairing user's needs.

Further, in the printing apparatus, preferably, the control unit determines that the printing of the second job is to be performed on the unprinted fed paper in a case where a paper size of the unprinted fed paper and a paper size set in the second job coincide with each other and automatic paper quality selection to the effect that the paper quality is to be automatically selected is set in the second job.

According to the configuration, it is possible to make effective use of unprinted fed paper without impairing user's needs.

Further, in the printing apparatus, preferably, the control unit determines that the printing of the second job is to be performed on the unprinted fed paper in a case where a paper size of the unprinted fed paper and a paper size set in the second job coincide with each other and plain paper automatic selection to the effect that the paper quality is to be automatically selected from paper quality of a plain paper type is set for the second job, if paper quality of the unprinted fed paper is a plain paper type.

According to the configuration, it is possible to make effective use of unprinted fed paper without impairing user's needs.

Further, in the printing apparatus, preferably, the control unit determines that the printing of the second job is to be performed on the unprinted fed paper in a case where a paper size of the unprinted fed paper and a paper size set in the second job coincide with each other and paper quality of the unprinted fed paper and the paper quality set in the second job are different from each other, if the paper quality of the unprinted fed paper is a plain paper type or recycled paper and the paper quality set in the second job is a plain paper type or recycled paper.

According to the configuration, it is possible to make effective use of unprinted fed paper.

According to another aspect of the invention, there is provided a printing apparatus including: a printing mechanism which feeds paper from a paper feeding port and performs printing on the fed paper; and a control unit which controls the printing mechanism, in which the control unit determines whether or not a setting content of at least one of a first job and a second job is to be changed, based on the setting content for the paper in the first job and the second job, when receiving the second job following the first job before printing the received first job is started and changes the setting content of at least one of the first job and the second job, in a case of determining that the change is to be made.

According to the configuration, the processing at the time of the job cancellation can be performed quickly.

Further, in the printing apparatus, preferably, the control unit changes a setting content corresponding to paper quality of the second job to predetermined paper quality set in the first job, in a case where the predetermined paper quality is set as the setting content in the first job and paper quality automatic selection to the effect that paper quality of the paper is to be automatically selected as the setting content is set in the second job, and the control unit causes the printing mechanism to perform printing of the second job on unprinted fed paper which is fed from the paper feeding port and is not yet printed, if conditions other than the paper quality are satisfied, when a cancellation instruction is received during printing the first job.

According to the configuration, the processing at the time of the job cancellation can be performed quickly and the unprinted fed paper can be used effectively.

Further, in the printing apparatus, preferably, the control unit changes a setting content corresponding to paper quality of the second job to paper quality set in the first job, in a case where any one of paper quality of a plain paper type as the setting content is set in the first job and plain paper automatic selection to the effect that the paper quality of the paper as the setting content is to be automatically selected from the paper quality of the plain paper type is set in the second job, and the control unit causes the printing mechanism to perform printing of the second job on unprinted fed paper which is fed from the paper feeding port and is not yet printed, if conditions other than the paper quality are satisfied, when receiving a cancellation instruction during printing the first job.

According to the configuration, the processing at the time of the job cancellation can be performed quickly and the unprinted fed paper can be used effectively.

According to a still another aspect of the invention, there is provided a method for controlling a printing apparatus which feeds paper from a paper feeding port and performs printing on the fed paper, including: determining whether or not printing a second job print is to be performed on unprinted fed paper which is fed from the paper feeding port and is paper not yet printed, based on paper quality of the paper used in the first job and paper quality of the paper set in the second job following the first job when a cancellation instruction is received during printing the first job; and performing the printing of the second job on the unprinted fed paper in a case of determining that the printing is to be performed.

According to still another aspect of the invention, there is provided a method for controlling a printing apparatus which feeds paper from a paper feeding port and performs printing on the fed paper, including: determining whether or not a setting content of at least one of a first job and a second job is to be changed, based on the setting content for the paper in the first job and the second job, when receiving the second job following the first job before printing the received first job is started; and changing the setting content of at least one of the first job and the second job, in a case of determining that the change is to be made.

Further objects and features of the invention will be apparent from the embodiments of the invention described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
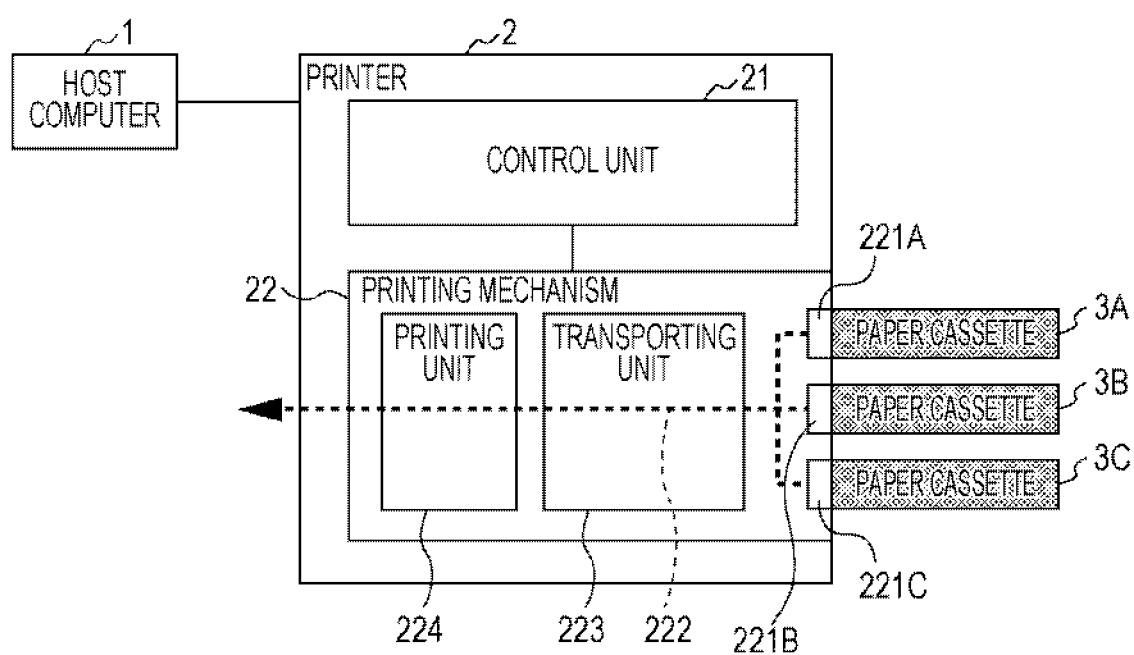
FIG. 1 is a schematic configuration diagram according to an embodiment of a printing apparatus to which the invention is applied.

Hereinafter, an embodiment of the invention will be described with reference to the drawings. However, it is to be understood that such an embodiment does not limit the technical scope of the invention. In the drawings, the same or similar constituent elements are denoted by the same reference numerals or reference symbols.

FIG. 1 is a schematic configuration diagram relating to an embodiment of a printing apparatus to which the invention is applied. A printer 2 illustrated in FIG. 1 is a printing apparatus to which the invention is applied, and the printer 2 determines whether or not the printer performs the printing of the subsequent job on the unprinted fed paper, based on the paper feeding port 221 set in the subsequent printing job (hereinafter referred to as subsequent job) (second job), in a case where there is a paper (hereinafter referred to as "unprinted fed paper") that is already fed from a paper feeding port 221 and is not yet printed, when the printer 2 receives an instruction of a job cancellation. Accordingly, effective utilization of unprinted fed paper is realized with high user convenience.

As illustrated in FIG. 1, printer 2 is an ink jet printer that performs printing on paper in response to a print request from a host device, such as host computer 1, or to an operation on printer 2, for example. The printer 2 has a function of feeding a plurality of sheets of paper following the printing paper to the transporting path 222 in advance and printing at a high speed. In addition, although not illustrated, the printer 2 has a function of receiving data from an integrated facsimile receiving apparatus or a separate facsimile receiving apparatus and printing the contents of the facsimile.

The host computer 1 is connected to the printer 2 in a communicative manner and makes a print request to the printer 2 based on the user operation or the like. The host computer 1 is configured by a personal computer or the like and includes an application which generates graphics or characters to be printed and a printer driver for printer 2 (both not illustrated).

The print request described above is made by sending print data generated by the printer driver from host computer 1 to printer 2. Here, one print request is called a printing job, and various print conditions for each printing job are set. In the setting items, items of "paper feeding port", "paper size", and "paper discharging direction", and "paper quality" are included, regarding the paper to be used.

"Paper feeding port" is an item for specifying that paper is fed from which paper feeding port 221 of the plurality of paper feeding ports 221 provided in the printer 2, "paper size" is an item for specifying a size of the paper to be used for printing (A4, A3, and the like), and "paper discharging direction" is an item for specifying the orientation of the paper when discharging the printed paper (vertical or horizontal, in this case the same as paper feeding direction), and "paper quality" is an item for specifying the type (plain paper, recycled paper, or the like) depending on the material of the paper.

The contents of these setting items are set (specified) by the user operation for the interface screen provided by the printer driver, and the setting content are included in the print data.

"Paper feeding port" can be set to "paper feeding port automatic operation" and in a case where "paper feeding port" is set as such, on the printer 2 side, a suitable paper feeding port 221 is selected based on other setting contents. In addition, for "paper size" and "paper discharging direction", "paper size" and "paper discharging direction" can be unspecified, in a case where "paper size" and "paper discharging direction" is set as such, on the printer 2 side, suitable "paper size" and "paper discharging direction" are appropriately selected. In addition, for the "paper quality", the paper quality be set to "paper quality automatic operation" or "plain paper type automatic operation", in a case where the "paper quality" is set as such, on the printer 2 side, a suitable paper quality is selected. In the plain paper, there are a plurality of kinds depending on color and paper thickness, each of them is one "paper quality". Therefore, plain paper has a plurality of paper quality, which are collectively referred to as "plain paper type". In a case where "plain paper type automatic operation" is set, the printer 2 selects an appropriate paper quality from "plain paper type".

Hereinafter, specific examples of the plain paper type paper will be described.

Plain type paper includes plain type 1, plain type 2, letterhead, colored paper, printed paper, cardboard 1, cardboard 2, cardboard 3, and cardboard 4, for example. The recycled paper may be included in a plain paper type paper. The thickness of plain type 2 is larger than the thickness of plain type 1. For cardboards 1 to 4, the thicknesses of the cardboards increase in the order of the cardboard 4, the cardboard 3, the cardboard 2, and the cardboard 1. The user can preset the paper to be included in the plain paper type to the printer 2.

As illustrated in FIG. 1, the printer 2 includes a control unit 21 and a printing mechanism 22. The control unit 21 is a controller that controls each portion of the printer 2 and includes a CPU, a RAM, a ROM, NVRAM, an Application Specific Integrated Circuit (ASIC), or the like as a hardware configuration.

When the control unit 21 receives a print request, such as when receiving print data from host computer 1, the control unit 21 controls the printing mechanism 22 and prints the image to be printed on paper under the printing conditions corresponding to the contents set in the printing job. Regarding paper to be used, the control unit 21 selects (determines) the appropriate paper feeding port 221, and then the paper is fed to perform printing, based on the setting content of "paper feeding port", "paper size", "paper discharging direction", and "paper quality" described above.

In addition, as described above, in the printer 2, since the paper is fed before printing, when the printing job is canceled in the middle of printing, although unprinted fed paper is left in the transporting path 222 of the printer 2 (in machine, in casing), the control unit 21 determines whether or not to print the subsequent job on the unprinted fed paper based on the setting content of the subsequent job after the print data is received, and then, performs printing processing or paper discharging processing based on the determination. Processing related to these unprinted fed paper (Hereinafter, referred to as unprinted fed paper processing) is executed by a program for instructing the processing, a CPU that operates in accordance with the program, and a ROM, a RAM, a NVRAM, or the like that stores programs operating in cooperation with each other.

The printing mechanism 22 performs printing on paper or the like (print medium) in accordance with an instruction from the control unit 21. The printing mechanism 22 includes a plurality of paper feeding ports 221, a transporting path 222, a transporting unit 223, a printing unit 224, and the like, as illustrated in FIG. 1.

In the present embodiment, three paper feeding ports 221 (221A, 221B, and 221C) are provided and three paper feed cassettes 3 (3A, 3B, and 3C) for accommodating various kinds of paper are inserted thereinto. The paper is fed from one of the paper feeding ports 221 at the time of printing, and the fed paper is transported along the transporting path 222.

The transporting unit 223 includes a transporting roller, a driving source, transmission gear, and the like, and transports the paper fed from the paper feeding port 221 to the printing position, and thereafter, the paper after the printing is transported and discharged. The unprinted fed paper is present in the transporting path 222 from the paper feeding port 221 to the printing position.

The printing unit 224 executes printing on the paper transported to the printing position. In the present embodiment, the printing unit 224 includes a printing head having a plurality of nozzles for discharging ink, and a carriage mounting on the printing head and moving in the sub-scanning direction, or the like.

In the printer 2 according to the present embodiment having the configuration described above, when a print request is received, the control unit 21 determines a paper feeding port 221 suitable for the print request, feeds paper from the paper feeding port, and performs printing, but there is a feature in the unprinted fed paper processing when the printing job is canceled during printing, and the following describes the specific contents thereof.

Figure 2:
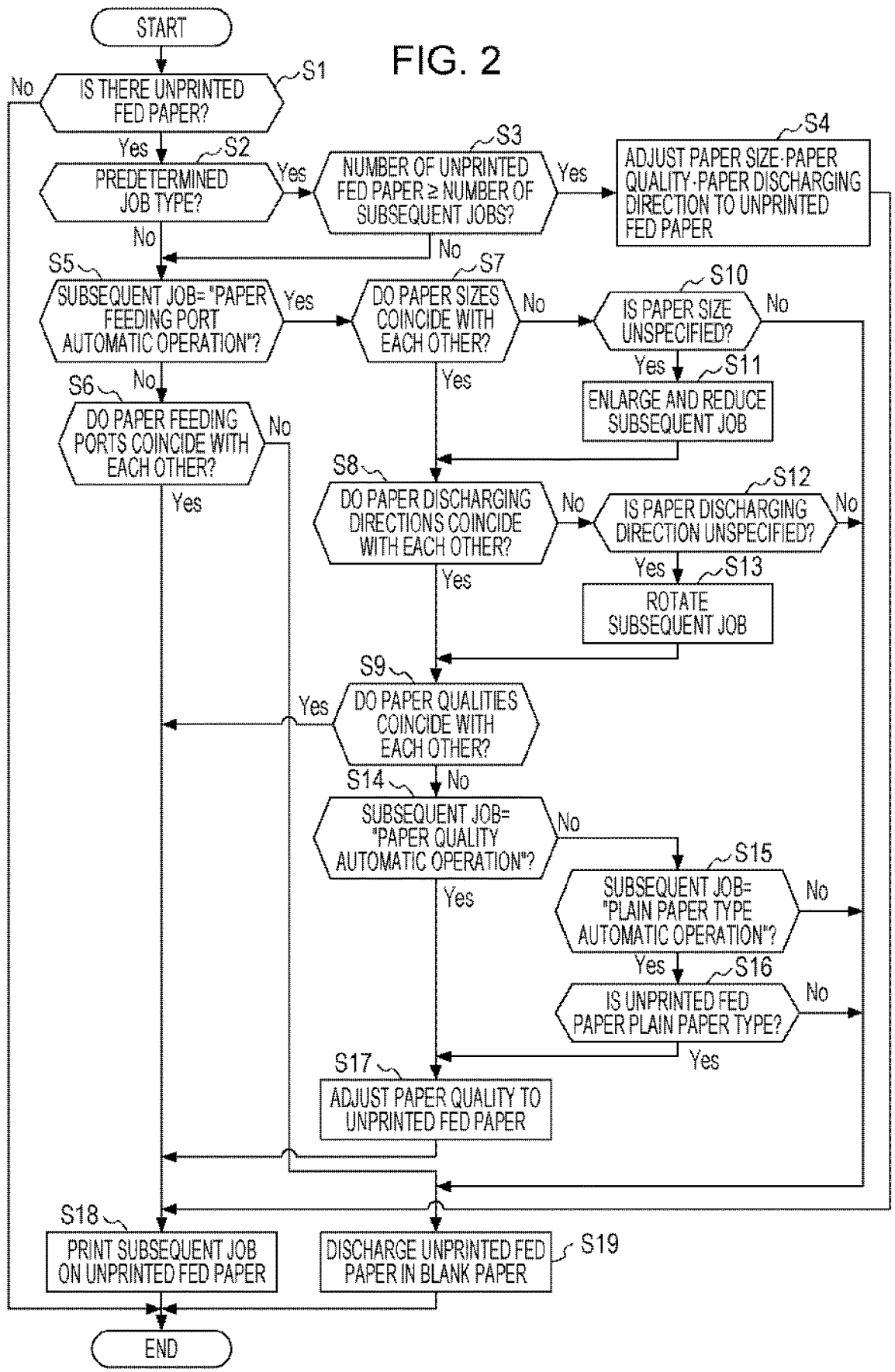
FIG. 2 is a flowchart illustrating a procedure of unprinted fed paper processing.

FIG. 2 is a flowchart illustrating procedure of the unprinted fed paper processing. The control unit 21 receives an instruction of cancellation of a printing job (hereinafter, referred to as a job cancellation) during printing and at this time, the unprinted fed paper processing is started when the print data of the subsequent job is received. The job cancellation is to be performed by a user operation for an operation unit (not illustrated) of the host computer 1 or the printer 2 and the signal thereof is received by control unit 21.

The control unit 21 determines whether or not there is unprinted fed paper (step S1 in FIG. 2). During processing a printing job being printed (hereinafter, referred to as current job) (first job), since the control unit 21 is grasping how many sheets of paper of the current job is already fed and how many of sheets of paper is printed, the control unit 21 determines whether or not there is unprinted fed paper based on the information thereof.

As a result of the determination, if the unprinted fed paper is not present (if not) (No in step S1 of FIG. 2), the control unit 21 ends the unprinted fed paper processing.

As a result of the above determination, if there is unprinted fed paper (if any) (Yes in step S1 of FIG. 2), the control unit 21 determines whether or not the subsequent job is a type of a predetermined printing job (hereinafter, referred to as a job type) (step S2 of FIG. 2). Here, the predetermined job type is a printing job that may perform the printing to convey content regardless of the format of the paper, and the state, for example, is a status sheet illustrating the status of the printer 2, printing of the received facsimile, or the like. The control unit 21 determines the determination from the header information of the subsequent job.

As the result of the determination, in a case where the subsequent job is not the predetermined job type (No in step S2 in FIG. 2), the control unit 21 determines whether or not the subsequent job is printed on the unprinted fed paper, based on the setting content for "paper feeding port" of the subsequent job.

Specifically, the control unit 21 determines whether or not the setting of the "paper feeding port" of the subsequent job is "paper feeding port automatic operation" (step S5 in FIG. 2).

As a result thereof, in a case where the setting for the "paper feeding port" of the subsequent job is not set to "paper feeding port automatic operation" (No in step S5 of FIG. 2), the control unit 21 determines whether or not the paper feeding port 221 set to the subsequent job coincides with the paper feeding port 221 of the unprinted fed paper (current job) (step S6 in FIG. 2).

As a result of the determination, if the paper feeding port 221 of the subsequent job and the paper feeding port 221 of the unprinted fed paper coincide with each other (Yes in step S6 of FIG. 2), the control unit 21 determines that the subsequent job is printed on the unprinted fed paper, and causes the printing mechanism 22 to execute printing of the subsequent job on the unprinted fed paper (step S18 of FIG. 2). Specifically, the unprinted fed paper located on the upstream side of the printing position of the transporting path 222 is sequentially supplied to the printing position by the transporting unit 223 and the printing unit 224 performs printing with respect to supplied unprinted fed paper.

On the other hand, as a result of the determination, if the paper feeding port 221 of the subsequent job does not coincide with the paper feeding port 221 of the unprinted fed paper (No in step S6 of FIG. 2), the control unit 21 determines that the subsequent job does not yet printed on the unprinted fed paper and causes the printing mechanism 22 to discharge the unprinted fed paper with blank paper (left unprinted) (step S19 of FIG. 2). Specifically, the transporting unit 223 sequentially discharges the unprinted fed paper which is positioned in the transporting path 222 from the printer 2.

Next, in a case where the process returns to the step S5 and the setting for the "paper feeding port" of the subsequent job is "paper feeding port automatic operation" (Yes in the step S5 of FIG. 2), the control unit 21 determines whether or not the subsequent job is printed on the unprinted fed paper based on the setting content other than "paper feeding port" set to be subsequent job, that is, the setting content of "paper size", "paper discharging direction", and "paper quality".

Specifically, all the setting content of "paper size", "paper discharging direction", and "paper quality" of subsequent job are coincide with all the contents of unprinted paper supply (current job) (paper size, paper discharging direction, and paper quality) (Yes in step S7, Yes in step S8, Yes in step S9 in FIG. 2), the control unit 21 determines that the subsequent job is printed on the unprinted fed paper, and causes the printing mechanism 22 to print the subsequent job with respect to the unprinted fed paper (step S18 of FIG. 2).

In addition, even in a case where the setting content of "paper size", "paper discharging direction", and "paper quality" do not coincide with the contents of unprinted fed paper (current job), in a case where the setting content is "unspecified", in a case where the contents can be freely selected, the control unit 21 edits the subsequent job, determines to print the subsequent job on the unprinted fed paper, and causes the printing mechanism 22 to execute printing of a subsequent job for unprinted fed paper (step S18 of FIG. 2).

Specifically, in a case where the "paper size" of the subsequent job does not coincide with the content of the unprinted fed paper (current job) (No in step S7 of FIG. 2), the control unit 21 determines whether or not the setting content for the "paper size" of the subsequent job is "unspecified" (step S10 of FIG. 2). In a case where the setting content is "unspecified" (Yes in step S10 of FIG. 2), the control unit 21 executes the enlargement and reduction processing with respect to the subsequent job so as to adjust to the size of the unprinted fed paper (step S11 in FIG. 2). In the enlargement and reduction processing, the control unit 21 enlarges or reduces the size of the image drawn in the printing job so as to fit the size of the unprinted fed paper. After the enlargement and reduction processing, the process proceeds to step S8. In a case where the subsequent job is a printing job for printing data received by a facsimile machine, the enlargement and reduction processing can be performed.

On the other hand, in a case where the setting content of the "paper size" is not "unspecified" (No in step S10 of FIG. 2), the control unit 21 determines that the subsequent job is not to be printed on the unprinted fed paper and causes the printing mechanism 22 to discharge unprinted fed paper as a blank sheet (step S19 of FIG. 2).

In addition, in a case where the "paper discharging direction" of the subsequent job does not coincide with the content of the unprinted fed paper (current job) (No in step S8 of FIG. 2), the control unit 21 determines whether or not the setting content for the "paper discharging direction" of the subsequent job is "unspecified" (Yes in step S12 of FIG. 2). In a case where the setting content is "unspecified" (Yes in step S12 of FIG. 2), the control unit 21 executes a rotation processing for the subsequent job so as to adjust to the printing direction of the unprinted fed paper (step S13 of FIG. 2). In the rotation processing, the control unit 21 rotates the direction of the image drawn in the printing job so as to fit the direction of the unprinted fed paper. After the rotation processing, the process proceeds to step S9.

On the other hand, if the setting content of the "paper discharging direction" is not "unspecified" (No in step S12 of FIG. 2), the control unit 21 determines that the subsequent job is not to be printed on the unprinted fed paper, and causes the printing mechanism 22 to discharge unprinted fed paper as a blank paper (step S19 in FIG. 2).

In addition, in a case where the "paper quality" of the subsequent job does not coincide with the content of the unprinted fed paper (current job) (No in step S9 of FIG. 2), the control unit 21 determines whether or not the setting content for the "paper quality" of the subsequent job is "paper quality automatic operation" (step S14 of FIG. 2). In a case where the setting content is "paper quality automatic operation" (Yes in step S14 of FIG. 2), the control unit 21 adjusts the "paper quality" setting of the subsequent job to the paper quality of the unprinted fed paper (step S17 of FIG. 2). Thereafter, the control unit 21 determines to print the subsequent job on the unprinted fed paper, and causes the printing mechanism 22 to execute the printing of the subsequent job for the unprinted fed paper (step S18 of FIG. 2).

On the other hand, in a case where the setting content of the subsequent job is not "paper quality automatic operation" (No in step S14 of FIG. 2), the control unit 21 determines that whether or not the setting content for the "paper quality" of subsequent job is "plain paper type automatic operation" (Yes in step S15 of FIG. 2). In a case where the setting content is "plain paper type automatic operation" (Yes in step S15 of FIG. 2), the control unit 21 determines whether or not the paper type of the unprinted fed paper is the plain paper type (step S16 of FIG. 2). If the paper type of the unprinted fed paper is the plain paper type (Yes in step S16 of FIG. 2), the control unit 21 adjusts the "paper quality" setting of the subsequent job to the paper quality of the unprinted fed paper (step S17 in FIG. 2). Thereafter, the control unit 21 determines to print the subsequent job on the unprinted fed paper, and causes the printing mechanism 22 to execute the printing of the subsequent job for the unprinted fed paper (step S18 in FIG. 2).

In step S15, in a case where the setting content is not "plain paper type automatic operation" (No in step S15 of FIG. 2) or, in step S16, in a case where the unprinted fed paper is not a plain paper type (No in step S16 of FIG. 2), the control unit 21 determines that the subsequent job is not to be printed on the unprinted fed paper, and causes the printing mechanism 22 to discharge the unprinted fed paper in a blank paper (step S19 of FIG. 2).

In this case, in other words, in a case where a specific paper quality is set for the subsequent job and the specific paper quality is different from the paper quality of the unprinted fed paper, if the paper quality of both paper are plain paper types, the control unit may determine that printing of the subsequent job is to be performed on the unprinted fed paper, and causes the printing mechanism 22 to execute printing of the subsequent job on the unprinted fed paper.

In addition, in the same case, if both paper quality is plain paper type or recycled paper, the control unit determines that the subsequent job is to be printed on the unprinted fed paper, and may cause the printing mechanism 22 to execute printing of the subsequent job on the unprinted fed paper.

Next, in step S2, in a case where the subsequent job is a specific job type (Yes in step S2 of FIG. 2), the control unit 21 determines whether or not the number of unprinted fed paper is equal to or greater than the number of sheets of paper of the subsequent job (step S3 of FIG. 2). As result of the determination, in a case where the number of unprinted fed paper is less than the number of sheets of paper in the subsequent job (No in step S3 of FIG. 2), the process proceeds to step S5.

On the other hand, in a case where the number of unprinted fed paper is equal to or greater than the number of sheets of paper of the subsequent job (Yes in step S3 of FIG. 2), the control unit 21 adjusts the setting content of "paper size", "paper discharging direction", and "paper quality" of the subsequent job to the unprinted fed paper (step S4 of FIG. 2), determines that the subsequent job is printed on the unprinted fed paper, and causes the printing mechanism 22 to execute printing of a subsequent job on the unprinted fed paper (step S18 of FIG. 2). When the setting content of the "paper size" and "paper discharging direction" of the subsequent job are adjusted to the unprinted fed paper, the control unit 21 executes enlargement, reduction, and rotation of the image drawn in the subsequent job as necessary.

In a case where subsequent jobs are printing of the received facsimile, only in a case where the "alternative output" function is turned on (in operation) on the printer 2, printing of a subsequent job may be executed on unprinted fed paper. In present specification, the alternative output function may be referred to as an acting print function.

Here, "alternative output" means that the image of the printing job of the facsimile machine is reduced and printed on a paper of a smaller size than the original size thereof, and enlarges the image of the facsimile of the printing job and prints the image on paper of a size larger than the original size thereof.

As described above, the subsequent job is printed on the unprinted fed paper (S18), or when the unprinted fed paper is discharged (S19), the unprinted fed paper processing ends.

Next, Processing performed when the control unit 21 receives a printing job will be described. This processing is a processing of changing setting content related to the paper in advance for the received printing job so that the subsequent job can be immediately printed on the unprinted fed paper when the job cancellation is generated (hereinafter, referred to as setting change processing). The setting change processing may not be performed.

Figure 3:
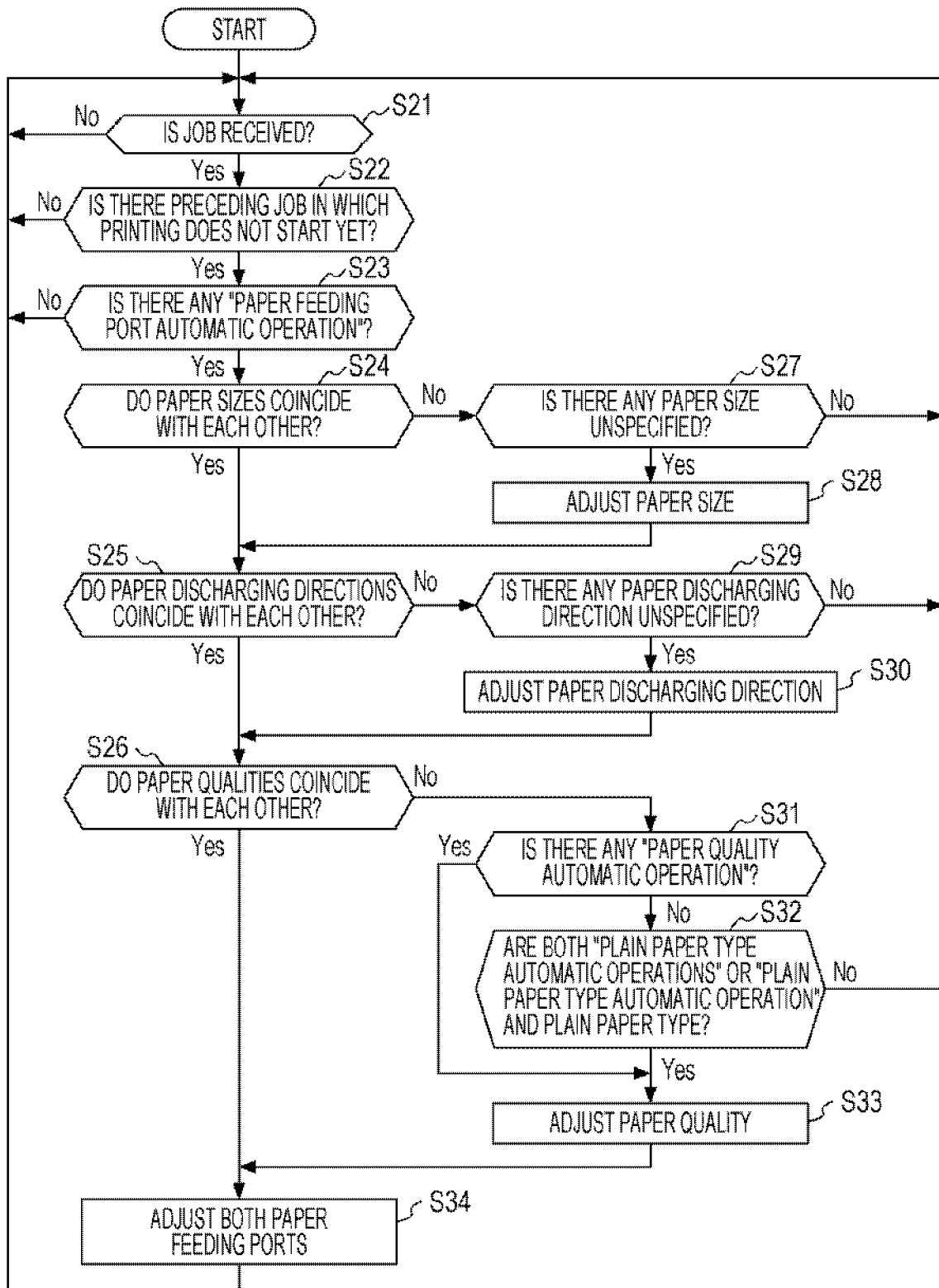
FIG. 3 is a flowchart illustrating a procedure of setting change processing.

FIG. 3 is a flowchart illustrating the procedure of the setting change processing. First, when the control unit 21 waits for receiving one printing job (No in step S21 of FIG. 3) and receives one printing job (Yes in step S21 of FIG. 3), the control unit 21 determines that whether or not the printing of the printing job (hereinafter, referred to as "preceding job") (first job) received immediately before the received printing job (hereinafter referred to as the "receiving job") (second job) is not yet started (step S22 in FIG. 3). In a case where there is no preceding job and in a case where printing is already started even if there is the preceding job is found (No in step S22 of FIG. 3), the control unit 21 does not perform the setting change and waits for receiving the next printing job (to S21).

In a case where there is a preceding job that is not yet printed (Yes in step S22 of FIG. 3), the control unit 21 determines whether or not the setting change is to be performed based on the setting content for the "paper feeding port" of the receiving job and the preceding job.

Specifically, the control unit 21 determines whether or not the setting for at least one of the "paper feeding ports" of the receiving job and the preceding job is "paper feeding port automatic operation" (step S23 of FIG. 3).

As a result, in a case where the setting for the "paper feeding port" of the subsequent job is not set to "paper feeding port automatic operation" (No in step S23 of FIG. 3), the control unit 21 does not perform the setting change and waits for receiving the printing job (to S21).

In a case where the setting for the "paper feeding port" of one of the printing jobs is "paper feeding port automatic operation" (Yes in step S23 of FIG. 3), the control unit 21 determines whether or not the setting change is to be performed based on the setting content other than "paper feeding port" which is set to the subsequent job, that is, the setting content of "paper size", "paper discharging direction", and "paper quality".

Specifically, if all the setting content of "paper size", "paper discharging direction", and "paper quality" between the preceding job and the receiving job are coincide with each other (Yes in step S24, Yes in step S25, Yes in S26 in FIG. 3), the control unit 21 sets the "paper feeding port" of the preceding job and the receiving job to a specific paper feeding port suitable for the setting content of "paper size", "paper discharging direction", and "paper quality" 221. In other words, the setting content of the "paper feeding port" of the preceding job and the receiving job are adjusted to the same paper feeding port 221 (step S34 in FIG. 3). For example, setting of both "paper feeding port" is changed to "paper feeding port 221A." In a case where the setting content of either the preceding job or the receiving job is a specific paper feeding port 221 that is not "paper feeding port automatic operation", the setting content of "paper feeding port" of the other printing job is adjusted to the paper feeding port 221. After the setting change, the process returns to step S21.

In addition, even in a case where the setting contents of "paper size", "paper discharging direction", and "paper quality" do not coincide on both printing jobs, in a case where the setting content is "unspecified" and in a case where the contents can be freely selected, the control unit 21 changes the setting content and determines that the setting content of both "paper feeding ports" with each other.

Specifically, in a case where "paper sizes" of the receiving job and preceding job do not coincide with each other (No in step S24 of FIG. 3), the control unit 21 determines whether or not the setting content for at least one of "paper sizes" of the received job and the preceding job are "unspecified" (step S27 of FIG. 3). In a case where the setting content for at least one of the printing job is "unspecified" (Yes in step S27 of FIG. 3), the control unit 21 performs a processing of adjusting the paper sizes of the receiving job and the preceding job to each other (step S28 of FIG. 3). Specifically, the control unit 21 adjusts the setting content of the "paper size" of the other printing job to the paper size set in the printing job unless the setting content of any printing job is "unspecified". In addition, if the setting content is "unspecified" for both printing jobs, the control unit 21 changes the setting content of the "paper size" for both printing jobs to the same specific paper size. In a case where the paper size after the setting change does not fit the size of the image drawn by the printing job, the control unit 21 enlarges or reduces the size of the image to fit the set paper size appropriately. Thereafter, the processing proceeds to step S25.

On the other hand, in a case where the setting content of the "paper size" is not "unspecified" for any of the printing jobs (No in step S27 of FIG. 3) the control unit 21 does not change the setting, and waits for receiving the next printing job (to S21).

In a case where "paper discharging directions" of the receiving job and the preceding job does not coincide with each other (No at step S25 in FIG. 3), the control unit 21 determines whether or not the setting content for at least one of "paper discharging direction" of receiving job and the preceding job is "unspecified" (step S29 of FIG. 3). In a case where the setting content for at least one of printing jobs is "unspecified" (Yes in step S29 of FIG. 3), the control unit 21 performs a processing of adjusting the paper discharging directions of the receiving job and the preceding job to each other (step S30 of FIG. 3). Specifically, the control unit 21 adjusts the setting content of the "paper discharging direction" of the other printing job to the paper discharging direction set in the printing job unless the setting content for both printing jobs are "unspecified". In addition, if the setting content for both printing jobs are "unspecified", the control unit 21 changes the setting content of the "paper discharging direction" of both printing jobs to the same specific paper discharging direction. In a case where the paper discharging direction after the setting change and the direction of the image drawn in the printing job does not fit, the control unit 21 rotates the direction of the image appropriately so as to fit to the set paper discharging direction. Thereafter, the processing proceeds to step S26.

On the other hand, in a case where the setting content of the "paper discharging direction" for any of the printing jobs are not "unspecified" (No in step S29 of FIG. 3), the control unit 21 does not change the setting and waits for receiving the next printing job (to S21).

In addition, in a case where the setting content of "paper quality" of the preceding job and the receiving job do not coincide with each other ("No" in step S26 of FIG. 3), the control unit 21 determines whether or not the setting content for at least one "paper quality" of the receiving job and the preceding job is "paper quality automatic operation" (step S31 in FIG. 3). In a case where the setting content is "paper quality automatic operation" for at least one of the printing jobs (Yes in step S31 of FIG. 3), the control unit 21 performs a processing of adjusting the paper quality of the receiving job the preceding job to each other (step S33 of FIG. 3). Specifically, if the setting content of one of the printing jobs is not "paper quality automatic operation", the control unit 21 adjusts the setting content of the "paper quality" of the other printing job to the paper quality set to the printing job. In addition, if the setting content of both printing jobs are "paper quality automatic operation", the control unit 21 changes the setting content of "paper quality" of both printing jobs to the same specific paper quality.

Thereafter, the control unit 21 sets the "paper feeding port" of the preceding job and the receiving job to a specific paper feeding port 221 suitable for the setting content of "paper size", "paper discharging direction", and "paper quality". In other words, the setting content of the "paper feeding port" of the preceding job and the receiving job adjust to the same paper feeding port 221 (step S34 in FIG. 3), and after the setting change, the processing returns to step S21.

On the other hand, in a case where the setting content of the "paper quality" is not "paper quality automatic operation" for any of the printing jobs (No in step S31 of FIG. 3), the control unit 21 determines that the setting content of "paper quality" for both printing job are set to "plain paper type automatic operation", or whether or not the setting content of the "paper quality" for one printing job is set to "plain paper type automatic operation" and the setting content of the "paper quality" for the other printing job is set to the plain paper type of a specific paper quality (step S32 in FIG. 3).

In a case where any one of the conditions is satisfied (Yes in step S32 of FIG. 3), the control unit 21 performs processing of adjusting the paper quality of the received job and the preceding job to each other (step S33 of FIG. 3). Specifically, if the setting content of one of the printing jobs is not "plain paper type automatic operation", the control unit 21 adjusts the setting content of the "paper quality" of the other printing job to the paper quality set in the printing job. In addition, if the setting content of both printing jobs is "plain paper type automatic operation", the control unit 21 changes the setting content of "paper quality" of both printing jobs to the same paper quality of the plain paper type. Thereafter, the processing proceeds to step S34, and the process is performed in the same manner as in the above case.

On the other hand, in a case where none of the conditions of step S32 is satisfied (No in step S32 of FIG. 3), the control unit 21 does not change the setting content and waits for receiving the next printing job (to S21).

As illustrated above, the setting change process is to be performed when the printing job is received.

In a case where the printer 2 is a device that only feeds paper of the same size in the same paper discharging direction, when job cancellation is performed, the control unit 21 may determine whether or not to print the subsequent job on the unprinted fed paper based on the paper quality set for the subsequent job and the paper quality of the unprinted fed paper. In a case where it is determined that the subsequent job is to be printed on the unprinted fed paper, the control unit 21 causes the printing mechanism 22 to execute the printing as in the above case.

The determination based on the paper quality described above is performed in the same manner as the processing described based on steps S9 and S14 to S17 in FIG. 2. Further, in a case where the paper quality set in the subsequent job and the paper quality of the unprinted fed paper are also a plain paper type paper quality or recycled paper, the control unit 21 determines that the subsequent job is to be printed on the unprinted fed paper.

In addition, similarly, in a case where the printer 2 is a device that only feeds paper of the same size in the same discharging direction, the control unit 21 may determine whether or not to perform setting change processing for adjusting both the setting content to each other based on the paper quality set in the preceding job and the receiving job at the time of receiving the printing job. In this case, the determination based on the paper quality is performed in the same manner as the processing explained based on the steps S26, S31, and S32 in FIG. 3.

As described above, in the printer 2 according to the present embodiment and modification example thereof, when the job is canceled during printing the current job, if the print data of the subsequent job is received, it is determined whether or not to print a subsequent job on an unprinted fed paper based on the setting content of the "paper feeding port" set in the subsequent job, and it is the printing is to be performed in a case of determining that the printing is to be performed. Therefore, it is possible to effectively use the paper while satisfying the user's request.

In addition, specifically, if the same paper feeding port 221 as the unprinted fed paper is set in the subsequent job, it is determined that printing of the subsequent job is to be performed on the unprinted fed paper, and the paper can be effectively used while reliably satisfying the user's request.

In addition, in a case where "paper feeding port automatic operation" is set for the subsequent job, if conditions other than "paper feeding port" are satisfied, It is determined to print a subsequent job on an unprinted fed paper, further effective use of paper can be attempted, and user's convenience is improved.

If the condition of "paper size" and "paper discharging direction" is satisfied as a condition other than "paper feeding port", it is determined that the subsequent job is printed on the unprinted fed paper, and the user request can be satisfied.

In addition, if the "paper size" of the subsequent job is set to "unspecified", the image data (printing range) of the subsequent job is enlarged or reduced to correspond to the unprinted fed paper, and thus it is determined that the condition is satisfied. Therefore, opportunities to utilize unprinted fed paper can increase.

In addition, in a case where "paper size" of the subsequent job is specified and the paper size does not coincide with the unprinted fed paper, the unprinted fed paper is discharged. Accordingly, it is possible to prevent printing which does not desire by a user.

In addition, in a case where a subsequent job is a printing job that prints the data received by the facsimile machine, by performing the enlargement or reduction processing described above, it is possible to use unprinted fed paper that does not hinder the user.

In addition, if the "paper discharging direction" of the subsequent job is set to "Unspecified", the image data of the subsequent job is rotated so as to correspond to the unprinted fed paper, and it is determined that the condition is satisfied. Therefore, opportunities to utilize unprinted paper can increase.

In addition, in a case where the number of unprinted fed paper is equal to or greater than the number of subsequent jobs, opportunities to utilize unprinted paper can increase by printing subsequent jobs on unprinted fed paper.

Further, in a case where the number of unprinted fed papers is equal to or greater than the number of subsequent jobs, if the job type of the subsequent job is a printing job for printing the status sheet, it is possible to utilize the unprinted fed paper without reducing the user's convenience, by printing the subsequent job on the unprinted fed paper.

Further, in addition, in a case where the number of unprinted fed papers is equal to or greater than the number of subsequent jobs, the job type of the subsequent job is a printing job that prints data received by the facsimile machine, and in a case where the facsimile alternative output function is activated, it is possible to utilize the unprinted fed paper without reducing the user's convenience, by printing the subsequent job on the unprinted fed paper.

In addition, In a case where the printer 2 is a device that only feeds paper of the same size and in the same paper discharging direction, when job cancellation is performed, it is determined whether or not to print a subsequent job on an unprinted fed paper based on the paper quality set for the subsequent job and the paper quality of the unprinted fed paper. Accordingly, it is possible to utilize unprinted fed paper more effectively without impairing user's needs.

In particular, in a case where the paper quality that is set for the subsequent job coincides with the quality of the unprinted fed paper, the subsequent job can be printed on the unprinted fed paper, so that it is possible to use unprinted fed paper that does not hinder the user.

In addition, in a case where the paper size set for the subsequent job coincides with the paper size of the unprinted fed paper, if the "paper quality" of the subsequent job is set to "paper quality automatic operation", it is determined that the subsequent job is printed on the unprinted fed paper. Accordingly, it is possible to utilize unprinted fed paper more effectively without impairing user's needs.

In addition, in a case where the paper size set for the subsequent job coincides with the paper size for the unprinted fed paper, if "paper quality" of the subsequent job is set to "plain paper type automatic operation", and if the paper quality of the unprinted fed paper is a plain paper type, it is determined that the subsequent job is printed on the unprinted fed paper. Accordingly, it is possible to utilize unprinted fed paper more effectively without impairing user's needs.

Further, in addition, in a case where the paper size set for the subsequent job and the paper size of the unprinted fed paper coincide with each other and the paper quality set for the subsequent job is different from the paper quality for the unprinted fed paper, if both paper quality are plain paper type, it can be determined that the subsequent job is printed on the unprinted fed paper. Accordingly, it is possible to effectively utilize unprinted fed paper.

Further, in addition, in a case where the paper size set for the subsequent job and the paper size of the unprinted fed paper coincide with each other and the paper quality set for the subsequent job is different from the paper quality for the unprinted fed paper, if both paper quality are plain paper type or recycled paper, it can be determined to print a subsequent job on unprinted fed paper. Accordingly, it is possible to effectively utilize unprinted fed paper.

In addition, in a case where the next printing job is received before the printing job for the previous job is started, the setting content of both printing jobs are changed as appropriate based on the contents set for both printing jobs. Accordingly, it is possible to quickly process a printing using unprinted fed paper at the time of job cancellation.

Specifically, in a case where "paper quality" of any printing job is set to "paper quality automatic operation" and a specific paper quality is set to the other printing job, the former "paper quality" is changed to the specific paper quality set for the latter. Accordingly, when there is a job cancellation during printing the preceding printing job among the both, printing to the unprinted feed can be performed quickly.

In addition, in a case where the "paper quality" of any printing job is set to "plain paper type automatic operation" and the plain paper type paper quality is set to the other printing job, the former "paper quality" is changed to paper quality set for the latter. Accordingly, when there is a job cancellation during printing the preceding printing job among the both, printing to the unprinted fed paper can be performed quickly.

In this embodiment, an example in which the CPU (processor) executes each process is described.

Here, in this specification, the CPU may be configured with one or more CPUs, or may be configured with one or more integrated circuits (for example, ASIC). In addition, the CPU may be configured by a combination of one or a plurality of CPUs and one or a plurality of integrated circuits.

The protection scope of the invention is not limited to the embodiments described above, but extends to the invention described in the claims and equivalents thereof.

What is claimed is:

1. A printing apparatus comprising:
a printing mechanism which feeds paper from a paper feeding port and performs printing on the fed paper; and
a control unit configured to control the printing mechanism by performing at least the following:
in response to a determination that an unprinted fed paper is left at the paper feeding port, determining whether a paper quality of the unprinted fed paper is compatible with a paper quality of the paper set in a second print job, the unprinted fed paper being a single paper that the printing mechanism pulled into the paper feeding port during a first print job that is prior to the second print job, and
in response to a determination that the paper quality of the unprinted fed paper is compatible with the paper quality of the paper set in the second print job, causing the printing mechanism to perform the second print job on the unprinted fed paper.

2. The printing apparatus according to claim 1, wherein the control unit determines that the printing of the second job is to be performed on the unprinted fed paper in a case where the paper quality of the unprinted fed paper and paper quality set in the second job coincide with each other.

3. The printing apparatus according to claim 1, wherein the control unit determines that the printing of the second job is to be performed on the unprinted fed paper, in a case where paper quality and a paper size of the unprinted fed paper and the paper quality and a paper size set in the second job coincide with each other.

4. The printing apparatus according to claim 1, wherein the control unit determines that the printing of the second job is to be performed on the unprinted fed paper in a case where a paper size of the unprinted fed paper and a paper size set in the second job coincide with each other and automatic paper quality selection to the effect that the paper quality is to be automatically selected is set in the second job.

5. The printing apparatus according to claim 1, wherein the control unit determines that the printing of the second job is to be performed on the unprinted fed paper in a case where a paper size of the unprinted fed paper and a paper size set in the second job coincide with each other and plain paper automatic selection to the effect that the paper quality is to be automatically selected from paper quality of a plain paper type is set for the second job, if paper quality of the unprinted fed paper is a plain paper type.

6. The printing apparatus according to claim 1, wherein the control unit determines that the printing of the second job is to be performed on the unprinted fed paper in a case where a paper size of the unprinted fed paper and a paper size set in the second job coincide with each other and paper quality of the unprinted fed paper and the paper quality set in the second job are different from each other, if the paper quality of the unprinted fed paper is a plain paper type or recycled paper and the paper quality set in the second job is a plain paper type or recycled paper.

7. A printing apparatus comprising:
a printing mechanism which feeds paper from a paper feeding port and performs printing on fed paper; and
a control unit which controls the printing mechanism by performing the following acts:
receiving a first print job having a first paper setting and a second print job having a second paper setting,
determining whether or not a setting content of the first paper setting and the second paper setting is compatible before any of the first and second print jobs is performed,
in response to a determination that the setting content of the first paper setting and the second paper setting is compatible, the control unit causes the first print job and the second print job to be performed without changing paper setting of the printing apparatus.

8. The printing apparatus according to claim 7, wherein the control unit changes a setting content corresponding to paper quality of the second job to predetermined paper quality set in the first job, in a case where the predetermined paper quality is set as the setting content in the first job and paper quality automatic selection to the effect that paper quality of the paper is to be automatically selected as the setting content is set in the second job, and
wherein the control unit causes the printing mechanism to perform printing of the second job on unprinted fed paper which is fed from the paper feeding port and is not yet printed if conditions other than the paper quality are satisfied, when a cancellation instruction is received during printing the first job.

9. The printing apparatus according to claim 7, wherein the control unit changes setting content corresponding to paper quality of the second job to paper quality set in the first job, in a case where any one of paper quality of a plain paper type as the setting content is set in the first job and plain paper automatic selection to the effect that the paper quality of the paper as the setting content is to be automatically selected from the paper quality of the plain paper type is set in the second job, and wherein the control unit causes the printing mechanism to perform printing of the second job on unprinted fed paper which is fed from the paper feeding port and is not yet printed if conditions other than the paper quality are satisfied, when receiving a cancellation instruction during printing the first job.

10. A method for controlling a printing apparatus which feeds paper from a paper feeding port and performs printing on the fed paper, comprising:

in response to a determination that an unprinted fed paper is left at the paper feeding port, determining whether a paper quality of the paper used in the first print job and a paper quality of the paper set in a second print job, the unprinted fed paper being a single paper that the printing mechanism pulled into the paper feeding port during a first print job that is prior to the second print job, and in response to a determination that the paper quality of the unprinted fed paper is compatible with the paper quality of the paper set in the second print job, performing the printing of the second job on the unprinted fed paper.

11. A method for controlling a printing apparatus which feeds paper from a paper feeding port and performs printing on the fed paper, comprising:

receiving a first print job having a first paper setting and a second job having a second paper setting;

determining whether or not a setting content of the first paper setting and the second paper setting is compatible before any of the first and second print jobs is performed, in response to a determination that the setting content of the first paper setting and the second paper setting is compatible, performing the first print job and the second print job continuously without changing paper setting of the printing apparatus.

* * * * *